US012602084B2

(12) United States Patent (10) Patent No.: US 12,602,084 B2
Kim et al. (45) Date of Patent: Apr. 14, 2026

(54) ELECTRONIC DEVICE INCLUDING FLEXIBLE DISPLAY AND METHOD FOR OPERATING SAME

(71) Applicant: SAMSUNG ELECTRONICS CO., LTD., Suwon-si (KR)

(72) Inventors: Yongil Kim, Suwon-si (KR); Jongsoo Sung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/738,045

(22) Filed: Jun. 9, 2024

(65) Prior Publication Data

US 2024/0329689 A1 Oct. 3, 2024

Related U.S. Application Data

(63) Continuation of application No. 18/205,486, filed on Jun. 2, 2023, now Pat. No. 12,026,017, which is a (Continued)

(30) Foreign Application Priority Data

Dec. 4, 2020 (KR) ........................ 10-2020-0169007

(51) Int. Cl.
*G06F 3/041* (2006.01)
*G06F 1/16* (2006.01)
(Continued)

(52) U.S. Cl.
CPC .......... *G06F 1/1652* (2013.01); *G06F 1/1624* (2013.01); *G06F 1/1677* (2013.01);
(Continued)

(58) Field of Classification Search
CPC ...... G09F 9/301; G06F 1/1624; G06F 1/1652; G06F 1/1677; G06F 1/1688;
(Continued)

(56) References Cited

U.S. PATENT DOCUMENTS 10,564,675 B2 2/2020 Ka et al.
12,026,017 B2 * 7/2024 Kim ........................ G06F 3/165
(Continued)

FOREIGN PATENT DOCUMENTS

CN 106126175 A 11/2016
CN 109257504 A 1/2019
(Continued)

OTHER PUBLICATIONS

International Search Report and Written Opinion for International Application No. PCT/KR2021/017915, International Filing Date Nov. 30, 2021; Date of Mailing Mar. 2, 2022 (10 pages).
(Continued)

*Primary Examiner* — Joe H Cheng
(74) *Attorney, Agent, or Firm* — CANTOR COLBURN LLP

(57) ABSTRACT

An electronic device may include a housing, a first audio module positioned on a first side surface of the housing and a second audio module positioned on a second side surface of the housing, a display which includes a touch sensor panel, and moves with respect to the housing so at least a part of the display is exposed from the inside of the housing to the front side of the electronic device, and processor operatively connected to the display, wherein the processor is configured to identify whether the display moves by sliding or rolling with respect to the housing to allow at least a part of the display to be exposed, and correct an audio
(Continued)

signal with respect to the at least one first audio module and the at least one second audio module corresponding to the display being moved.

18 Claims, 15 Drawing Sheets

Related U.S. Application Data continuation of application No. PCT/KR2021/017915, filed on Nov. 30, 2021.

(51) Int. Cl.
*G06F 3/16* (2006.01)
*H04M 1/02* (2006.01)

(52) U.S. Cl.
CPC ............ *G06F 3/0412* (2013.01); *G06F 3/165* (2013.01); *H04M 1/0237* (2013.01); *H04M 1/0268* (2013.01)

(58) Field of Classification Search
CPC ...... G06F 1/1694; G06F 3/041; G06F 3/0412; G06F 3/165; G06F 3/167; G06F 2200/1614; G06F 2203/04102; G09G 2380/02; H04M 1/0237; H04M 1/0268
See application file for complete search history.

(56) References Cited

U.S. PATENT DOCUMENTS

| | | | |
|---|---|---|---|
| 2009/0051830 | A1 | 2/2009 | Matsushita et al. |
| 2013/0002595 | A1 | 1/2013 | Asagi |
| 2014/0086415 | A1 | 3/2014 | Sim et al. |
| 2014/0240264 | A1 | 8/2014 | Im et al. |
| 2015/0220299 | A1 | 8/2015 | Kim et al. |
| 2016/0191690 | A1 | 6/2016 | Park et al. |
| 2017/0045996 | A1 | 2/2017 | Ka et al. |
| 2017/0093450 | A1 | 3/2017 | Xia et al. |
| 2017/0101847 | A1 | 4/2017 | Hazel |
| 2018/0198899 | A1 | 7/2018 | Lee |
| 2018/0285061 | A1 | 10/2018 | Park et al. |
| 2018/0342231 | A1 | 11/2018 | Gan et al. |
| 2019/0137550 | A1 | 5/2019 | Zhang et al. |
| 2019/0158639 | A1 | 5/2019 | Xia et al. |
| 2019/0384438 | A1 | 12/2019 | Park et al. |
| 2020/0209924 | A1 | 7/2020 | Zuo |
| 2020/0371558 | A1 | 11/2020 | Kim et al. |
| 2020/0379719 | A1 | 12/2020 | Eronen et al. |
| 2021/0058704 | A1 | 2/2021 | Tang et al. |
| 2022/0248160 | A1 | 8/2022 | Liu |

FOREIGN PATENT DOCUMENTS

| | | |
|---|---|---|
| CN | 110989961 A | 4/2020 |
| CN | 111258531 A | 6/2020 |
| EP | 1970886 A1 | 9/2008 |
| JP | 2008294493 A | 12/2008 |
| KR | 20070049381 A | 5/2007 |
| KR | 20140107788 A | 9/2014 |
| KR | 20150093090 A | 8/2015 |
| KR | 20150125529 A | 11/2015 |
| KR | 20160080254 A | 7/2016 |
| KR | 20170006089 A | 1/2017 |
| KR | 20170142747 A | 12/2017 |
| KR | 20180109596 A | 10/2018 |
| KR | 20190086305 A | 7/2019 |
| KR | 20190119719 A | 10/2019 |
| KR | 20190141518 A | 12/2019 |
| KR | 20200037727 A | 4/2020 |
| WO | 2011118429 A1 | 9/2011 |

OTHER PUBLICATIONS

European Search Report corresponding to Application No. 21900975.0-1224; Dated Mar. 28, 2024; 11 pages.
Korean Examination Report corresponding to Application No. 10-2020-0169007; Dated Dec. 2, 2024.
Notice of Publication, Issued Dec. 7, 2023.

* cited by examiner

1100

ELECTRONIC DEVICE INCLUDING FLEXIBLE DISPLAY AND METHOD FOR OPERATING SAME

This application is a continuation application of U.S. patent application Ser. No. 18/205,486, filed on Jun. 2, 2023, now U.S. Pat. No. 12,026,017, which is a continuation application of International Application No. PCT/KR2021/017915 designating the United States, filed on Nov. 30, 2021, in the Korean Intellectual Property Receiving Office and claiming priority to Korean Patent Application No. 10-2020-0169007, filed on Dec. 4, 2020, in the Korean Intellectual Property Office, the disclosures of which are incorporated by reference herein in their entireties.

BACKGROUND

1. Field

Various embodiments relate to an electronic device including a flexible display and a method of operating the same.

2. Description of the Related Art

With the advancement of electronic technology, various types of flexible electronic devices have been developed. Such a flexible electronic device may secure portability, while providing a larger display. For example, the flexible electronic device is deformable in shape by user application of force, thus providing a foldable or bendable, slidable, or rollable display. For example, a display using an organic light emitting diode (or an electronic device equipped with the display) may implement a stable operation even if it is made very thin.

Further, user demands for the performance of electronic devices have gradually become advanced and diversified, and audio performance may be one of main factors that determine the performance of a product. Currently, a general electronic device includes a plurality of speakers and performs audio output using the plurality of speakers.

SUMMARY

A general electronic device uses speakers and/or microphones. Since a display having a fixed structure is mounted, the distances between the speaker and the microphone may always be fixed even if the speakers and/or the microphones are distributed at various positions in the electronic device. Accordingly, the electronic device may perform audio tuning by fixing a user's position and accordingly determining tuning parameters of the speakers and the microphones. Because the shape of the electronic device is not changed, additional tuning may not be necessary.

However, in an electronic device including a flexible display, a relative distance between a speaker and/or a microphone may be changed along with movement of a structure forming the electronic device and the resulting transitioning of a screen to an open state or a closed state.

Accordingly, in the electronic device including the flexible display, the position of the speaker and/or the microphone may be variable rather than fixed. In this case, a change in the relative distance between the speaker and/or the microphone may lead to a deviation in audio performance during audio tuning.

Various embodiments of the disclosure may provide an electronic device including a flexible display and a method of operating the same, which may increase audio performance by applying a different parameter according to a relative distance between a speaker and/or a microphone.

According to various embodiments, an electronic device includes a housing, at least one first audio module located on a first side surface of the housing, and at least one second audio module located on a second side surface of the housing, a display including a touch sensor panel, wherein the display is configured to move with respect to the housing so that at least a portion of the display is exposed from an inside of the housing to a front surface of the electronic device, and at least one processor operatively connected to the display. The at least one processor is configured to identify whether the display is moved to be at least partially exposed by rolling or sliding with respect to the housing, and correct the audio signals for the at least one first audio module and the at least one second audio module in response to the display being moved.

According to various embodiments, an electronic device includes a housing including a first housing part and a second housing part configured to movably engage with the first housing part between a retracted position and an extended position. The electronic device includes a flexible display coupled to the first housing part and the second housing part such that a size of an area of the flexible display that is visible from a front side of the housing changes as the second housing part is moved between the retracted position and the extended position. The electronic device includes an actuator configured to move the second housing part with respect to the first housing part. The electronic device includes a first audio module located on a first side surface of the housing, and a second audio module located on a second side surface of the housing and a processor operatively connected to the flexible display. The processor is configured to identify whether at least a portion of the flexible display is exposed from the front side of the housing. The processor is configured to correct audio signals for the first audio module and the second audio module in response to identifying the at least a portion of the flexible display being exposed.

According to various embodiments, a method of correcting audio performance in an electronic device including a flexible display includes identifying whether a display is moved to be at least partially exposed by rolling or sliding with respect to a housing, and correcting the audio signals for the at least one first audio module located on a first side surface of the housing and the at least one second audio module located on a second side surface in response to the display being moved.

According to various embodiments, audio performance may be increased by applying a different audio parameter in spite of a non-fixed variable position of a speaker and/or a microphone in an electronic device including a flexible display.

According to various embodiments, audio performance may be optimized by identifying a relative distance between a speaker and/or a microphone and thus efficiently and conveniently performing audio tuning in an electronic device including a flexible display.

According to various embodiments, even when a flexible display is extended or contracted, an optimized sound from a speaker may be transmitted to a user, and the user's voice input to a microphone may also be optimized and used in an electronic device.

According to various embodiments, effective multimedia and call functions may be implemented, simultaneously with an optimized sound volume and improved sound quality.

In addition, various effects are not limited to the above-described effect, and other unmentioned effects will be clearly understood by those skilled in the art from the following description.

DETAILED DESCRIPTION

Hereinafter, various embodiments of the disclosure will be described with reference to the accompanying drawings. However, these are not intended to limit the disclosure to a specific embodiment and should be understood as including various modifications, equivalents, and/or alternatives of embodiments of the disclosure.

Figure 1:
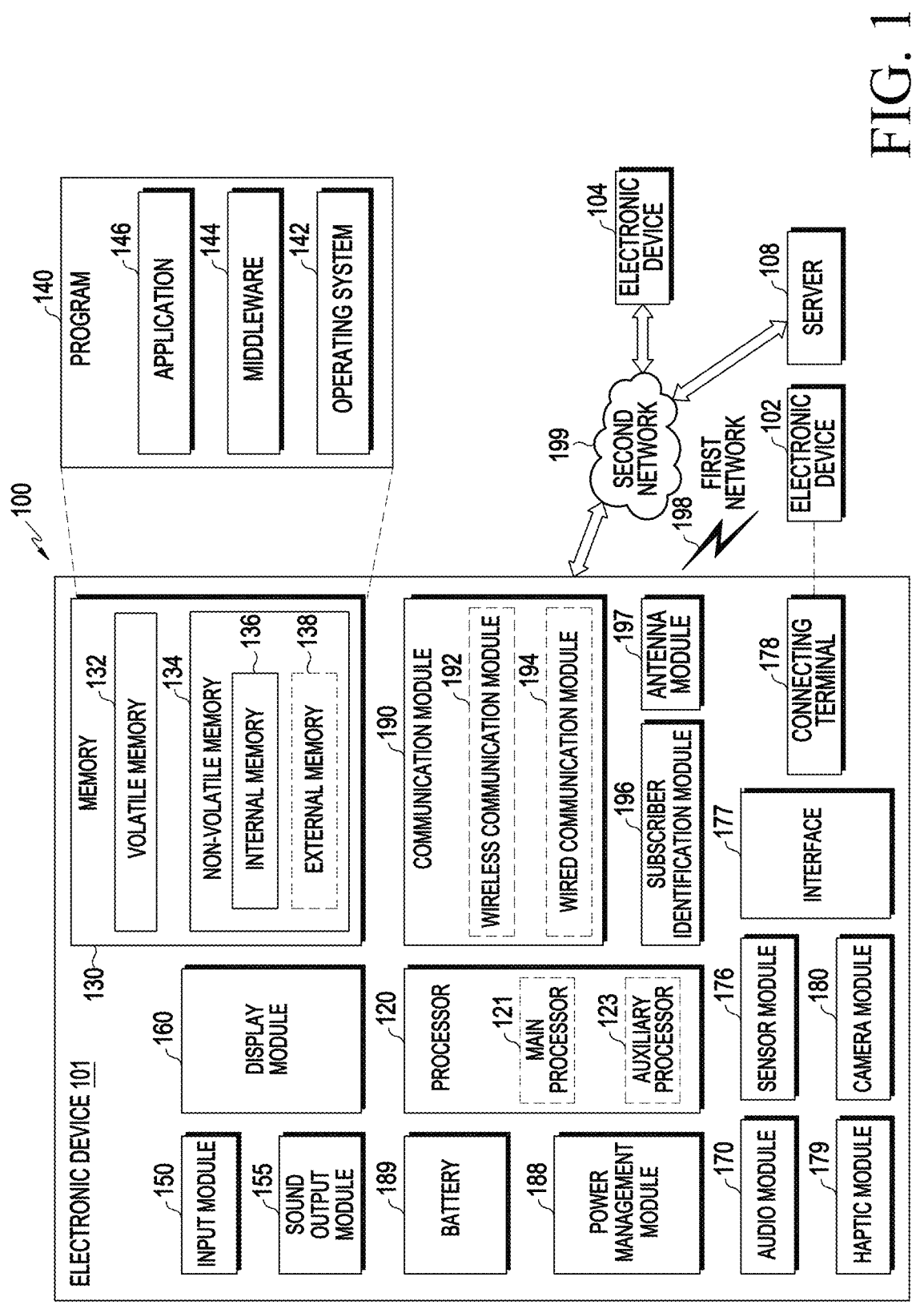
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A to 2D show an electronic device that is referred to for describing the types of electronic devices according to various embodiments. According to various embodiments, an electronic device 201, 202, 203 and/or 204 of FIGS. 2A to 2D (e.g., the electronic device 101 of FIG. 1) may include a housing, a display (e.g., the display module 160 of FIG. 1)

disposed to be exposed from a front surface of the electronic device 201, 202, 203, and/or 204 by rolling and/or sliding with respect to the housing, a structure (not shown) supporting the display, a driving module (not shown) moving the display, and at least one processor (e.g., the processor 120 of FIG. 1) operatively connected to the display.

According to various embodiments, at least a part of the display may be exposed to the outside through the housing. According to various embodiments, the display may include one or more displays. According to various embodiments, the display may include a non-bendable unfold display (e.g., a flat display or an edge display) or a flexible display (e.g., a foldable display, a rollable display, or a stretchable display). Although the display is described below as a flexible display, to which the disclosure is not limited, an unfold display may also be applied.

According to various embodiments, the at least one processor capable of performing and/or controlling the functions of the electronic device 201, 202, 203, and/or 204, and memory (e.g., the memory 130 of FIG. 1) may be disposed inside the housing.

According to various embodiments, a state in which the exposed area of the flexible display is the smallest may be referred to as a 'closed state', and a state in which the exposed area of the flexible display is the largest may be referred to as an 'open state'.

Figure 2A:
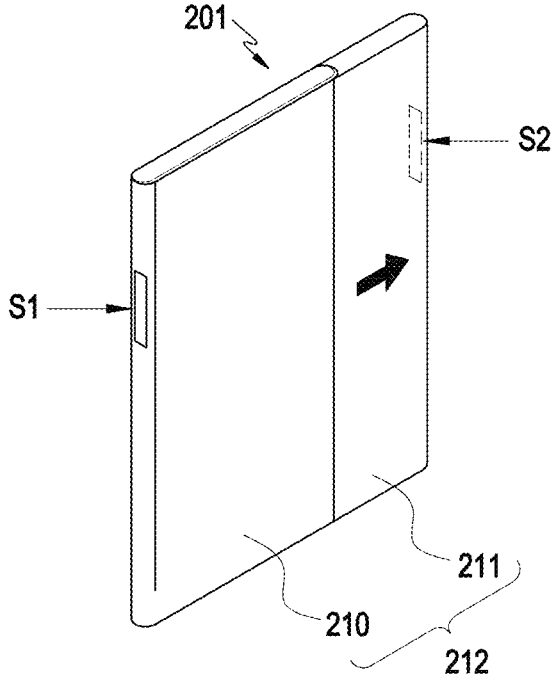
FIG. 2A is a perspective view of an electronic device referred to for describing the types of electronic devices according to an embodiment.

The electronic device 201 of FIG. 2A according to various embodiments is shown as including a flexible display which may be slidable, by way of example.

According to various embodiments, referring to FIG. 2A, at least a portion of the flexible display may move into and/or out of the housing according to a sliding operation. For example, when the slidable electronic device 201 receives a sliding extension command in the closed state, a part of the flexible display located inside the housing may slide to the outside of the housing, and thus the slidable electronic device 201 is placed in the open state. For example, an exposed part 210 of the flexible display in the closed state of the electronic device 201 may be referred to as a first part 210, and an exposed part of the flexible display in the open state of the electronic device 201 may be referred to as a second part 211. For example, an exposed part 212 may be an area obtained by adding the first part 210 and the area 211 of the flexible display, extended according to a sliding extension operation. For example, the flexible display disposed on the housing of the first part 210 may be in a fixed state.

According to an embodiment, in the case of the slidable electronic device 201 and/or a structure having a flexible display, the electronic device 201 may include a housing member which surrounds the display and/or in which an audio module (e.g., a speaker and a speaker hole) may be disposed.

According to an embodiment, when sidewalls are formed while surrounding the display, audio modules may be disposed at positions on both sides of the electronic device 201, for example, on both sidewalls of the electronic device 201 as indicated by S1 and S2.

While the audio modules are disposed on the sidewalls in FIG. 2A according to an embodiment, which does not limit the disclosure, the audio modules may be formed as separate structures and/or disposed on both edges of a combined and/or assembled structure and/or the housing. In this way, the electronic device 201 may be designed such that the audio modules are included in an extended and/or contracted structure of the flexible display according to the appearance and use condition of the flexible display.

Figure 2B:
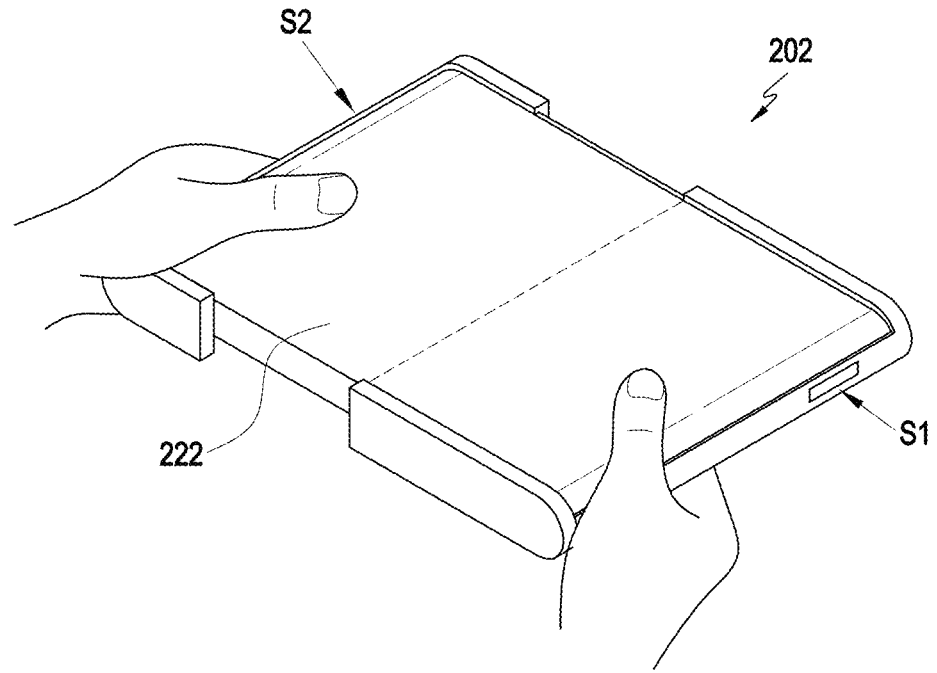
FIG. 2B is a perspective view of an electronic device referred to for describing the types of electronic devices according to an embodiment.

The electronic device 202 of FIG. 2B according to various embodiments is shown as having a flexible display which is rollable, by way of example.

According to various embodiments, referring to FIG. 2B, the flexible display may be disposed to surround the front surface, one side surface, and at least a part of the rear surface of the electronic device 202.

For example, in an embodiment, when receiving an extension command in the closed state, the rollable electronic device 202 may move the flexible display disposed on the front surface of the electronic device 202 so that an edge portion of the flexible display moves in a direction away from the housing of the electronic device 202. For example, the electronic device 202 may drive a roller (and/or driving module) (not shown) for moving the flexible display. As the flexible display moves (or rolls), a display storage area (not shown) inside of the housing of the electronic device 202 and/or a part of the flexible display disposed on the rear surface may move to the front surface of the electronic device 202, thereby extending an exposed part 222. Accordingly, the display may be kept in a rolled state inside of the housing of the electronic device 202, for example, in one side of the housing. For example, the flexible display disposed in the housing of the flexible display may move (or roll). According to various embodiments, a state in which the exposed part 222 of the flexible display is the largest may be referred to as the open state.

According to various embodiments, when receiving a contraction command in the open state, the rollable electronic device 202 may drive the roller (not shown) to move the edge portion of the flexible display disposed on the front surface of the electronic device 202 from an area outside of the housing of the electronic device 202 toward the housing. According to the driving of the roller, a part of the flexible display disposed on the front surface of the electronic device 202 may move to the display storage area (not shown) inside of the housing and/or to the rear surface, thereby contracting the exposed part of the flexible display. A state in which the exposed part of the flexible display is the smallest may be referred to as the closed state.

According to various embodiments, the flexible display of the rollable electronic device 202 may be disposed to enter the housing of the electronic device 202, instead of the rear surface of the electronic device 202, in an area surrounding one side surface of the electronic device 202.

According to an embodiment, in the case of the electronic device 202 or the flexible display, which has a rolling structure as illustrated in FIG. 2B, an audio module may be disposed in an area surrounding one side surface of the electronic device 202. For example, audio modules may be disposed on both the left and the right side surfaces of the electronic device 202, as indicated by S1 and S2.

Figure 3A:
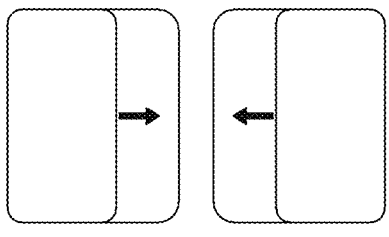
FIG. 3A is a diagram illustrating an example of a sliding operation of a flexible display in an electronic device according to an embodiment.
Figure 3B:
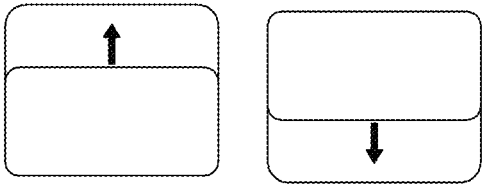
FIG. 3B is a diagram illustrating an example of a sliding operation of a flexible display in an electronic device according to an embodiment.

Although the flexible display is shown in an embodiment as being extended to the right of the electronic devices 201 and 202 in FIGS. 2A and 2B, the disclosure is not limited thereto. For example, in an embodiment and as illustrated in FIG. 3A, the flexible display may be extended and/or contracted to the right or left of the electronic devices 201 and 202. According to an embodiment, the electronic device of FIG. 3A may also have a separate side housing member on which an audio module may be disposed, as illustrated in FIGS. 2A and 2B. In another embodiment, as illustrated in FIG. 3B, when the electronic devices 201 and 202 are disposed in a landscape orientation, the flexible display may be extended and/or contracted upward or downward of the electronic devices 201 and 202.

Although FIGS. 2A and 2B show an embodiment where a long side of the flexible display is moved to extend and/or contract the flexible display in the rectangular electronic devices 201 and 202, the disclosure is not limited thereto. For example, in an embodiment and as illustrated in FIG. 3C, a short side of the flexible display may be moved to extend and/or contract the flexible display in the rectangular electronic devices 201 and 202.

Figure 3C:
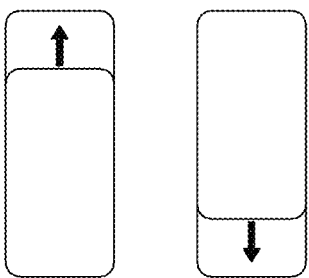
FIG. 3C is a diagram illustrating an example of a sliding operation of a flexible display in an electronic device according to an embodiment.

Although FIG. 3C shows that in an embodiment the rectangular electronic devices 201 and 202 are disposed in a portrait orientation (e.g., portrait mode) and a short side of the flexible display is moved upward and/or downward to extend or contract the flexible display, the disclosure is not limited thereto. For example, in an embodiment where the rectangular electronic devices 201 and 202 are disposed in the landscape orientation (e.g., landscape mode), a short side of the flexible display may be moved to the left or right to extend and/or contract the flexible display.

Figure 3D:
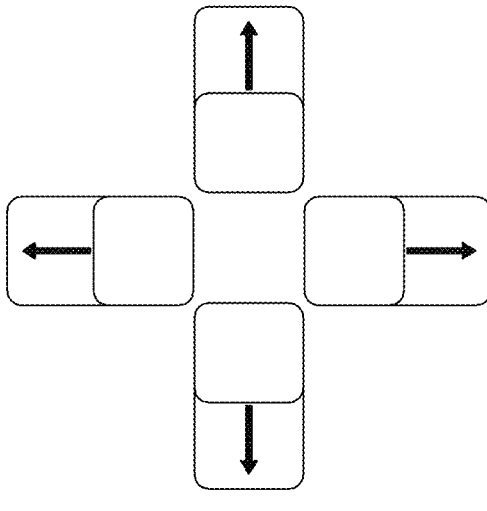
FIG. 3D is a diagram illustrating an example of a sliding operation of a flexible display in an electronic device according to an embodiment.

Although the electronic devices 201 and 202 are shown in an embodiment as rectangular in FIGS. 2A and 2B, the disclosure is not limited thereto. For example, in an embodiment and as illustrated in FIG. 3D, the electronic devices 201 and 202 may be square in shape. For example, the electronic devices 201 and 202 may extend and/or contract the flexible display by moving one side of the flexible display upward, downward, to the right, or to the left.

Although FIGS. 2A and 2B show an embodiment were the flexible display is extended and/or contracted only in one direction of the electronic devices 201 and 202, the disclosure is not limited thereto. For example, in an embodiment and referring to FIG. 2C, the slidable electronic device 203 may extend and/or contract the flexible display in both directions.

Figure 2C:
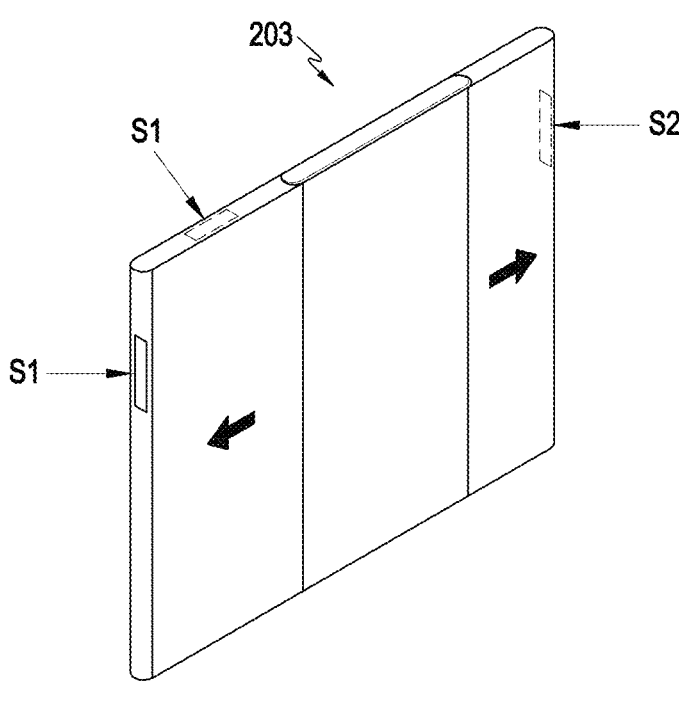
FIG. 2C is a perspective view of an electronic device referred to for describing the types of electronic devices according to an embodiment.

According to various embodiments, referring to FIG. 2C, in the case of the electronic device 203 that may be extended and/or contracted by sliding in both directions, audio modules may be disposed on both side surfaces as indicated by S1 and S2, whereas when a housing member covering the top and bottom of the display is included, an audio module may be disposed at a position corresponding to the housing member, that is, on the top and/or bottom of the electronic device 203, instead of both side surfaces.

According to various embodiments, the electronic device 203 may extend and/or contract the flexible display in only one direction or both directions.

Although FIG. 2C shows an embodiment where both long sides of the flexible display of the rectangular electronic device 203 are moved in both directions (e.g., left and right) to extend and/or contract the flexible display, the disclosure is not limited thereto. For example, in an embodiment and as illustrated in FIG. 3E, both short sides of the flexible display of the rectangular electronic device 203 may be moved in both directions (e.g., upward and downward) to extend and/or contract the flexible display.

Figure 3E:
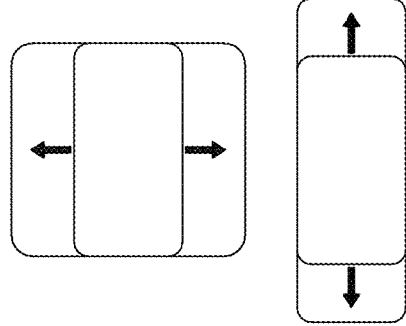
FIG. 3E is a diagram illustrating an example of a sliding operation of a flexible display in an electronic device according to an embodiment.

Although FIGS. 2C and 3E show an embodiment where the rectangular electronic device 203 is disposed in the portrait orientation, in another embodiment it may be disposed in the landscape orientation. According to various embodiments, the electronic device 203 may have a square shape.

Although FIG. 2C shows an embodiment where the flexible display is extended and/or contracted to both sides, the disclosure is not limited thereto. For example, in an embodiment and referring to FIG. 2D, the slidable electronic device 204 may extend and/or contract the flexible display in two non-bidirectional directions (e.g., one of left or right directions and one of upward and downward).

Figure 3F:
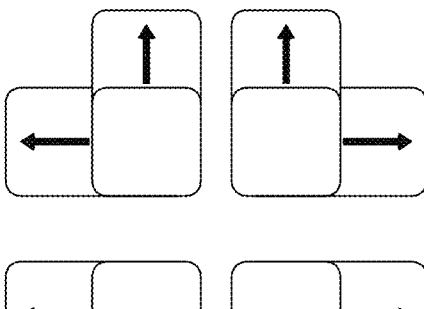
FIG. 3F is a diagram illustrating an example of a sliding operation of a flexible display in an electronic device according to an embodiment.

For example, in an embodiment and referring to FIG. 3F, the electronic device 204 may be slidable in two directions and may extend and/or contract the flexible display in the left and the up directions, the left and the down directions, the right and the up directions, and/or the right and the down directions.

According to various embodiments, the slidable electronic device 204 may extend and/or contract the flexible display through a sliding operation of a part of the flexible display disposed inside of the housing in both directions. In another embodiment, the electronic device 204 may extend and/or contract the flexible display by sliding a part of the flexible display disposed inside of the housing in one direction, as illustrated in FIG. 2A, and/or by moving the flexible display to the front surface and/or the rear surface of the electronic device 204 in another direction while the flexible display surrounds at least a part of the front surface, one side surface, and/or at least a part of the rear surface of the electronic device 204, as illustrated in FIG. 2B.

Figure 2D:
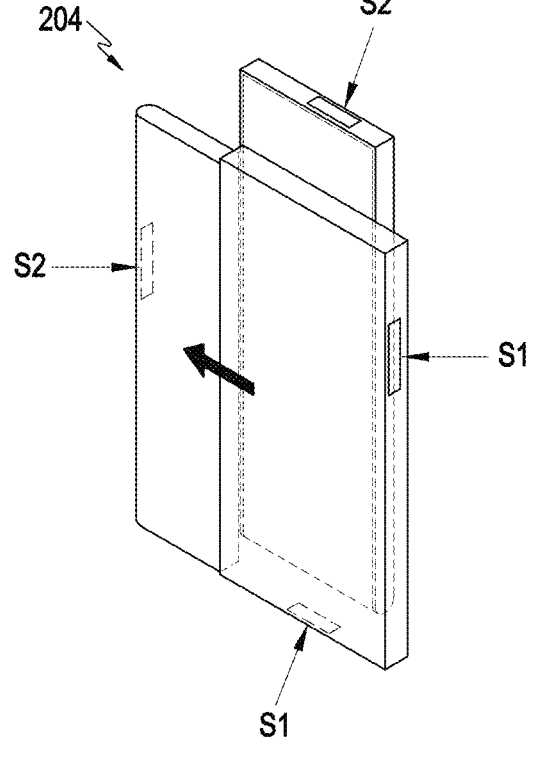
FIG. 2D is a perspective view of an electronic device referred to for describing the types of electronic devices according to an embodiment.

Although FIGS. 2D and 3F show an embodiment where the flexible display is extended and/or contracted in two directions, the disclosure is not limited thereto, and in various embodiments the flexible display may be extended and/or contracted in three or four directions.

According to various embodiments, when a housing member surrounding a side surface of the display is formed in the sliding electronic devices 201, 202, 203, and 204 as illustrated in FIGS. 2A to 2D, an audio module may be disposed in the form of a speaker and/or a speaker hole on the side housing member.

According to various embodiments, although audio modules may be disposed on both side surfaces as indicated by S1 and S2 in the slidable electronic devices 201, 202, 203, and 204 as illustrated in FIGS. 2A to 2D, an audio module may also be disposed at a position corresponding to a housing member surrounding the top and/or bottom of the display, that is, on the top and/or bottom of the electronic devices 201, 202, 203, and 204.

Figure 4A:
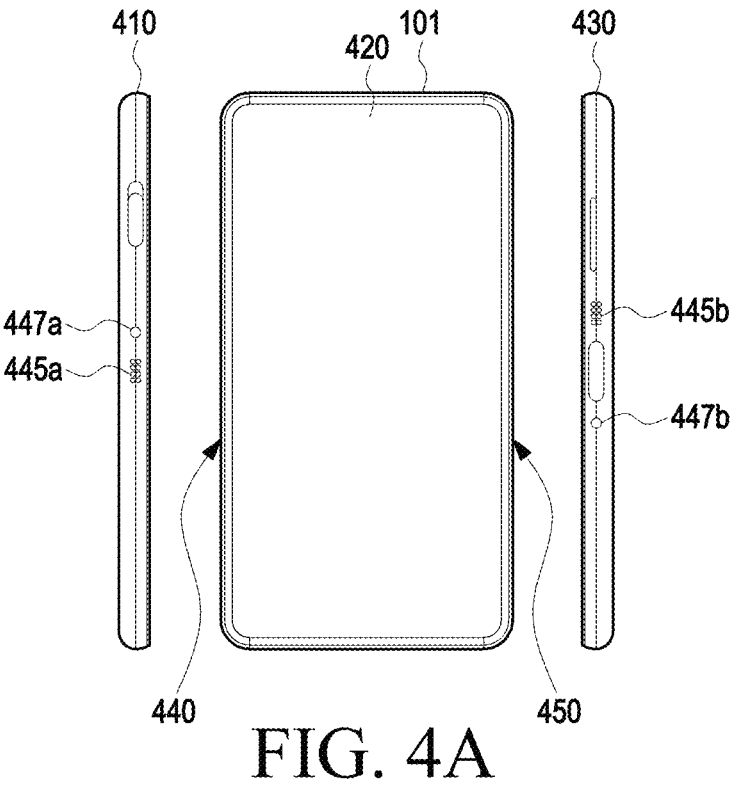
FIG. 4A shows multiple view of an electronic device illustrating a contracted state of a flexible display, when an electronic device is horizontally disposed according to various embodiments.
Figure 4B:
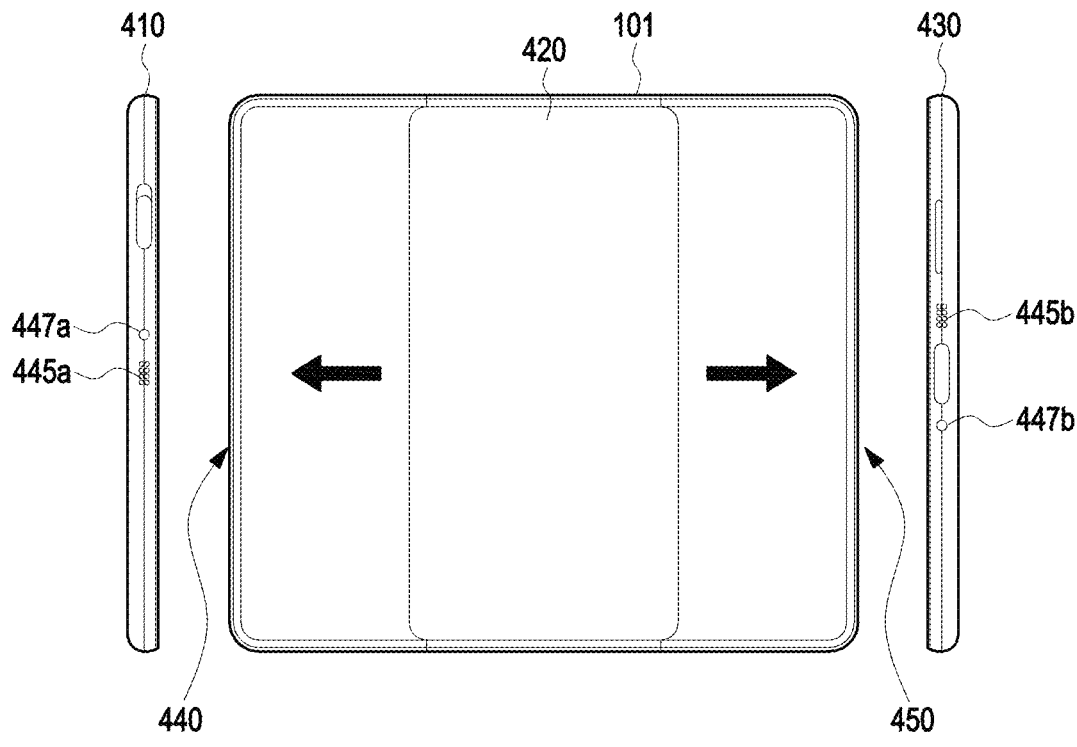
FIG. 4B shows multiple views of an electronic device illustrating an extended state of a flexible display, when an electronic device is horizontally disposed according to various embodiments.
Figures 5A, 5B:
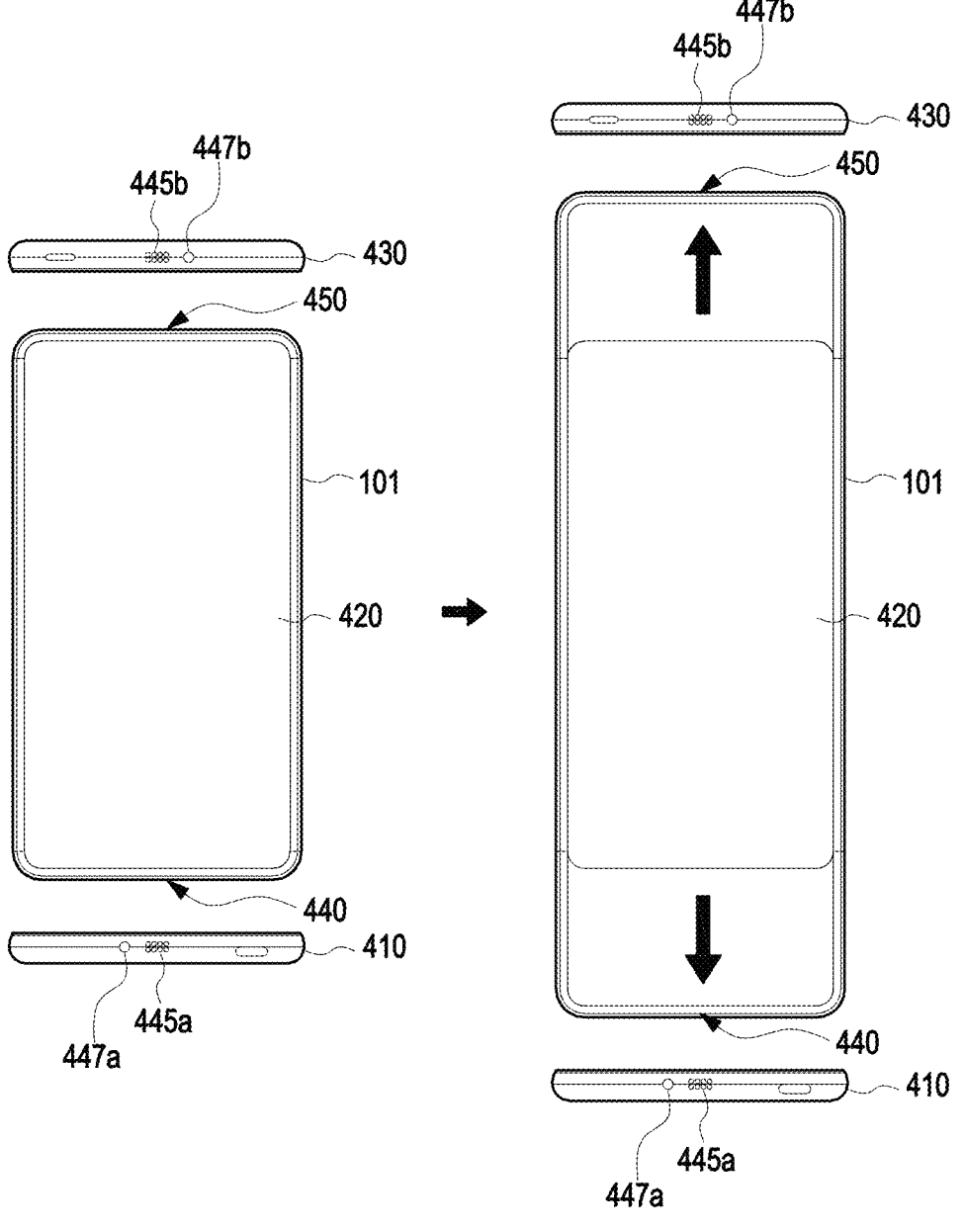
FIG. 5A shows multiple views of an electronic device illustrating a contracted state of a flexible display, when an electronic device is vertically disposed according to various embodiments.
FIG. 5B shows multiple views of an electronic device illustrating an extended state of a flexible display, when an electronic device is vertically disposed according to various embodiments.

FIG. 4A and FIG. 4B show multiple views of an electronic device illustrating the contracted and extended states of a flexible display, when the electronic device 101 is disposed in the landscape orientation (e.g., the landscape mode) according to various embodiments. FIG. 5A and FIG. 5B show multiple views of an electronic device illustrating the contracted and extended states of a flexible display, when the electronic device is disposed in the portrait orientation (e.g., the portrait mode) according to various embodiments.

According to various embodiments, FIG. 4A and FIG. 5A illustrate the contracted state of the flexible display, and FIG. 4B and FIG. 5B illustrate an extended state of the flexible display in which most of the flexible display is exposed from the front surface of the electronic device. According to an embodiment, the flexible display may be extended by a certain distance in one direction, and/or a structure enabling reciprocation for extension and/or contraction may be disposed.

In an embodiment and referring to FIG. 4A, FIG. 4B, FIG. 5A and FIG. 5B, the electronic device 101 may include a housing 420 and a display disposed in a space formed by the housing 420. At least a part of the display may have a foldable and/or bendable, slidable, and/or rollable shape. A surface on which the flexible display is disposed (and/or the surface on which the display module 160 is viewed from the outside of the electronic device 101) may be defined as the front surface of the electronic device 101. A surface opposite to the front surface may be defined as the rear surface of the electronic device 101. A side surface of the electronic device 101 may be defined as a surface surrounding a space between the front and rear surfaces.

According to various embodiments, the housing 420 may include a first sidewall 410 and a second sidewall 430.

According to various embodiments, the electronic device 101 may include audio modules 445a, 445b, 447a, and/or 447b. In the illustrated embodiment, the audio modules 445a, 445b, 447a, and/or 447b are disposed on the side-walls, which does not limit the disclosure. The audio modules 445a, 445b, 447a, and/or 447b and/or other audio modules which are not shown may be formed as separate structures and/or may be disposed on the edges of one or both sides of a combined and/or assembled structure and/or the housing 420. In this way, the electronic device 101 may be designed such that the audio modules 445a, 445b, 447a, and/or 447b may be included in an extended and a contracted structure of the flexible display according to the appearance and use condition of the flexible display.

According to various embodiments, the audio modules 445a, 445b, 447a, and 447b may include at least one speaker hole 445a and 445b and/or at least one microphone hole 447a and 447b. One of the speaker holes 445a and 445b may be provided as a receiver hole for a voice call, and the other may be provided as an external speaker hole. Microphones obtaining external sounds may be disposed in the microphone holes 447a and 447b, and in a certain embodiment, a plurality of microphones may be disposed to detect the direction of a sound. In a certain embodiment, the speaker holes 445a and 445b and/or the microphone holes 447a and 447b may be implemented as one hole, and/or a speaker (e.g., a piezo speaker) may be included without the speaker holes 445a and 445b.

According to an embodiment, the speaker hole indicated by reference numeral "445a" and/or the microphone hole indicated by reference numeral "447a" may be disposed on a first side surface (e.g., a side surface 440 or the first sidewall 410) of the housing 420, and the speaker hole indicated by reference number "445b" and/or the microphone hole indicated by reference number "447b" may be disposed on a second side surface (e.g., a side surface 450 or the second sidewall 430) of the housing 420.

Although one speaker hole and one microphone hole are shown in an embodiment as being disposed on each side surface of the housing 420 in FIG. 4A, FIG. 4B, FIG. 5A and FIG. 5B, by way of example, in an embodiment a plurality of speakers may be disposed to enhance audio quality. For example, two or more speakers may be disposed on the first side surface (e.g., the side surface 440 or the first side wall 410) of the housing 420, and/or two or more speakers may be disposed on the second side surface (e.g., the side surface 450 or the second side wall 430). In addition, a plurality of microphones may also be disposed on the side surfaces of the housing 420 adjacent to the positions where the speakers are disposed.

Figure 6:
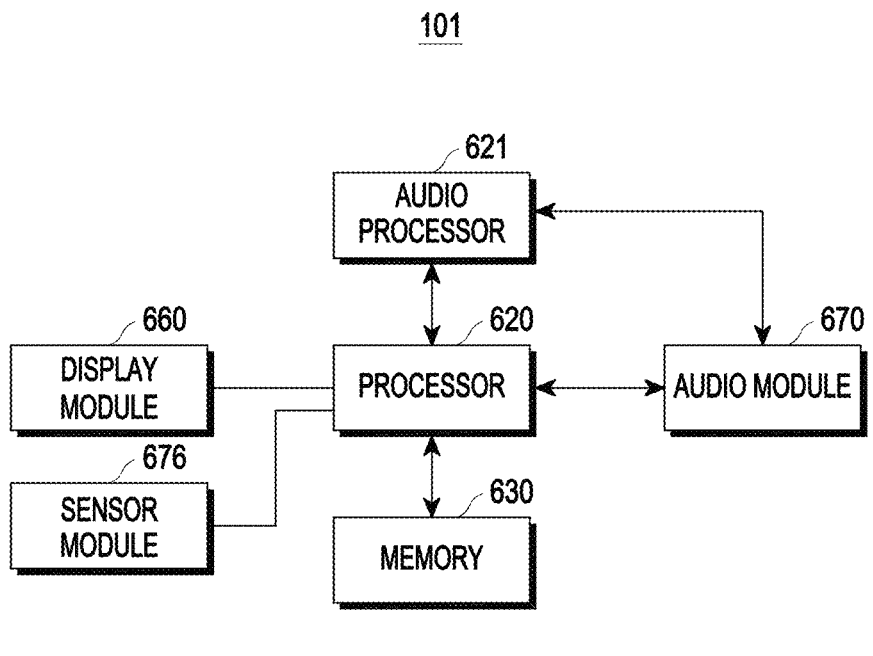
FIG. 6 is a block diagram illustrating an electronic device for correcting audio performance according to various embodiments.

FIG. 6 is a block diagram illustrating an electronic device for correcting audio performance according to various embodiments.

In an embodiment and referring to FIG. 6 components for correcting audio performance are illustrated, by way of example. Since the operations of components included in the electronic device 101 correspond to the components in FIG. 1, their detailed description will be avoided.

In an embodiment and referring to FIG. 6, the electronic device 101 for correcting audio performance may include a processor 620, an audio processor 621, memory 630, a display module 660, an audio module 670, and/or a sensor module 676.

According to various embodiments, the audio processor 621 may receive and/or output an audio signal through the audio module 670 (e.g., the audio module 170 of FIG. 1), and/or process an audio signal for the audio module 670. According to an embodiment, the audio processor 621 may be an audio digital signal processor (DSP). Although the processor 620 and the audio processor 621 are shown as separately implemented in FIG. 6, the audio processor 621 may be implemented to be included in the processor 620. For example, the processor 620 may include an audio DSP, and the audio DSP may be capable of driving a software (S/W) tuning solution.

According to various embodiments, the audio processor 621 may process an audio signal output through speakers (e.g., the speaker holes 445a and 445b of FIGS. 4 and 5) and/or an audio signal input to microphones (e.g., the microphone holes 447a and 447b of FIGS. 4 and 5), which may be generated by performing a voice call function, an audio file playback function, a video recording function, and/or the like. For example, when an earphone (not shown) is connected to the electronic device 101, the output audio signal may be output through a speaker of the earphone rather than the speakers (e.g., the speaker holes 445a and 445b of FIGS. 4 and 5).

According to various embodiments, the audio processor 621 and/or the processor 620 may adjust a sound volume/sound quality by correcting the input audio signal and/or the output audio signal using a potted software tuning solution. According to an embodiment, the audio processor 621 and/or the processor 620 may retrieve at least one of a plurality of audio parameters pre-stored in the memory 630 according to whether the flexible display is extended and/or extended distances, and/or apply the audio parameter to the input audio signal and/or the output audio signal by driving the S/W tuning solution.

According to various embodiments, the memory 630 may store a plurality of audio parameters for audio tuning. According to an embodiment, the audio parameters may be used to perform a filtering operation of blocking and/or passing a signal in a specific frequency band. According to an embodiment, since the processor 620 may apply an audio parameter corresponding to an extended distance of the flexible display when correcting an audio signal, a plurality of audio parameters may be stored in the memory 630.

According to an embodiment, when the electronic device 101 is disposed in the landscape orientation, the processor 620 may correct an audio signal by selecting at least one audio parameter for the landscape mode from among the plurality of audio parameters based on an extended distance of the flexible display, and/or applying the selected audio parameter for the landscape mode. For example, when the electronic device 101 is disposed in the landscape orientation, the distance between audio modules 670 which may be located at both ends of the electronic device 101 (e.g., the left and right ends of the electronic device 101) may be increased with respect to the user according to the extension of the flexible display. In this case, the speakers and/or the microphones are farther away from the user's mouth and/or ears than when the flexible display is contracted, and thus a high frequency with a short wavelength may be attenuated more than a low frequency. Accordingly, in an embodiment, in the landscape mode, the processor 620 may apply an audio parameter that compensates an audio signal by as much as an extended distance according to the extension of the flexible display.

According to an embodiment, the processor 620 may compensate a frequency waveform by decreasing a low frequency band and/or increasing a high frequency band in an input audio signal and/or an output audio signal by using an audio parameter.

According to an embodiment, when the electronic device 101 is disposed in the portrait orientation, the processor 620 may determine an audio parameter for the portrait mode in correspondence to an extended distance of the flexible display. For example, when the electronic device 101 is disposed in the portrait orientation, the audio module 670 located on the top of the electronic device 101 may be farther from the user according to the extension of the flexible display, and the audio module 670 located at the bottom of the electronic device 101 may be closer to the user. Accordingly, in the portrait mode, the processor 620 may apply an audio parameter compensating an audio signal by as much as the extended distance to an audio signal related to the audio module 670 located on the top of the electronic device 101, whereas the processor 620 may apply an audio parameter different from the above audio parameter to an audio signal related to the audio module 670 located on the bottom of the electronic device 101.

According to various embodiments, the processor 620 may identify an extension degree (or extended distance) of the flexible display in response to a user input for a rolling and/or sliding operation of the flexible display. According to an embodiment, the user input for the sliding operation of the flexible display may be inputting a command for sliding extension to increase the size of the exposed area of the flexible display and/or a command for sliding contraction to reduce the size of the exposed area of the flexible display.

According to various embodiments, when receiving the user input, the processor 620 may control a component (e.g., at least one of a roller, a roller driver, an actuator, or a sliding driver) for changing the size of the exposed area of the flexible display by an electrical signal, so that the size of the exposed area of the flexible display is changed without the user's physical input (e.g., pulling and/or pushing the flexible display).

According to an embodiment, the processor 620 may identify an extension degree based on a panel output range of the display module 660. In addition, the processor 620 may identify the extension degree (or extended distance) based on at least one of a sensor, a motor for moving the flexible display, or a change in the capacitance of the display module 660.

For example, in an embodiment, the processor 620 may identify the size of an exposed part (or area) of the display module 660 exposed from the front surface of the electronic device 101, when the display module 660 is extended and/or contracted. Accordingly, the processor 620 may correct an audio signal by applying an audio parameter corresponding to the extended distance among a plurality of audio parameters stored in the memory 660 according to the size (e.g., the extended distance and/or the output range of the display) of the exposed part of the display module 660. For example, when the extended distance is the smallest, the flexible display may be in the closed state in which the exposed area is the smallest, and when the extended distance is the largest, the flexible display may be in the open state in which the exposed area is the largest.

According to various embodiments, when stepwise rolling and/or sliding is possible, the processor 620 may perform a rolling and/or sliding operation of the flexible display based on a sliding length according to a user input. According to an embodiment, the processor 620 may also identify an extended and/or contracted distance of the flexible display in a stepwise manner in response to the stepwise sliding. For example, the processor 620 may increase and/or decrease an audio parameter to be applied according to the extended distance of the flexible display.

In general, a frequency and a wavelength may be inversely proportional to each other as in Equation 1. As the frequency increases, the wavelength may decrease and the attenuation may increase according to the distance. Therefore, as the distance from a speaker increases, a high frequency may be attenuated more than a low frequency from the user's point of view, and thus there may be a need for correcting the frequencies of an output audio signal from the speaker, audible to the user and/or an input audio signal of the microphone according to the extension of the flexible display.

$$v = f\lambda, \ f = \frac{1}{\tau} \qquad \text{[Equation 1]}$$

According to various embodiments, the processor 620 may use an audio parameter for increasing the high frequency and/or decreasing the low frequency in response to the extension of the flexible display. For example, as the flexible display is further extended, a high frequency part is less audible to the user, and thus a higher gain may be set for the high frequency. On the contrary, when the flexible display is changed from extension to contraction, the processor 620 may use an audio parameter decreasing the high frequency further than before because less attenuation occurs in the high frequency part.

According to various embodiments, the display module 660 may include a display panel and a touch sensor panel, as the flexible display.

According to various embodiments, the display module 660 may display a Graphical User Interface (GUI) and/or a guide message for controlling an audio tuning process. According to an embodiment, although audio tuning may be performed automatically without separate user control, the user may input an option choice or a setting value through the GUI, for example, in the presence of an option and/or a setting value to be selected directly by the user.

According to various embodiments, the sensor module 676 may include sensors such as an acceleration sensor and/or a gyro sensor. According to an embodiment, the sensor module 676 may output sensing information for identifying whether the electronic device 101 is disposed in the portrait or landscape orientation. For example, when the sensing information is used, the processor 620 may identify the posture of the electronic device 101, and thus identify a direction in which the speakers disposed on both side surfaces of the housing of the electronic device 101 are facing.

For example, in an embodiment, when the electronic device 101 is disposed in the landscape orientation, the speakers and/or the microphones located on both side surfaces (e.g., the left and right side surfaces) of the housing of the electronic device 101 may have the same left and right distances from the user. On the other hand, when the electronic device 101 is disposed in the portrait orientation, the speaker and/or the microphone on the bottom may be closer to the user than the speaker and/or the microphone on the top among the speakers and/or the microphones located on both side surfaces (e.g., the top and bottom side surfaces) of the housing of the electronic device 101. Accordingly, in the case of the portrait mode based on a sensing result of the sensor module 676, the processor 620 may set different audio parameters to be applied to the audio module located on the bottom of the electronic device 101 and/or the audio module located on the top of the electronic device 101.

According to various embodiments, the electronic device 101 may include the housing 420, at least one first audio module (e.g., 445*a* and 447*a*) located on a first side surface of the housing, and/or at least one second audio module (e.g., 445*b* and 447*b*) located on a second side surface of the housing 420, a display (e.g., the display module 660) including a touch sensor panel wherein the display is configured to move with respect to the housing 420 so that at least a portion of the display is exposed from an inside of the housing to a front surface of the electronic device and at least one processor 620 operatively connected to the display. The at least one processor 620 may be configured to identify whether the display is extended to be at least partially exposed by rolling and/or sliding with respect to the housing, and/or correct audio signals for the at least one first audio module and/or the at least one second audio module in response to extension of the display.

According to various embodiments, the at least one processor may be configured to identify an extended distance of the display in response to the extension of the display, identify an audio parameter corresponding to the extended distance, and/or correct the audio signals for the at least one first audio module and/or the at least one second audio module by applying the identified audio parameter.

According to various embodiments, each of the at least one first audio module and the at least one second audio module may include at least one of a speaker or a microphone.

According to various embodiments, the at least one processor 620 may be configured to identify whether the electronic device is disposed in a landscape mode or a portrait mode, when the electronic device is disposed in the landscape mode, identify the extended distance of the display, and correct the audio signals for the at least one first audio module and/or the at least one second audio module by applying an audio parameter of the landscape mode corresponding to the extended distance.

According to various embodiments, the at least one processor 620 may be configured to, when the electronic device is disposed in the portrait mode, apply different audio parameters to the audio signals for the at least one first audio module and/or the at least one second audio module.

According to various embodiments, the at least one processor 620 may be configured to, when the first side surface of the housing corresponds to a bottom, and the second side surface corresponds to a top, apply a first audio parameter to the at least one first audio module located on the bottom, and/or apply a second audio parameter corresponding to the extended distance to the at least one second audio module located on the top.

According to various embodiments, the at least one processor 620 may be configured to, when the extended distance is a maximum distance, apply an audio parameter increasing a high frequency band and decreasing a low frequency band.

According to various embodiments, the at least one processor 620 may be configured to, when audio signals for at least one first speaker included in the at least one first audio module and/or at least one second speaker included in the at least one second audio module are corrected, apply the same audio parameter to the first speaker and the second speaker.

According to various embodiments, the at least one processor 620 may be configured to, when audio signals for at least one first speaker and/or at least one first microphone included in the at least one first audio module, and/or at least one second speaker and/or at least one second microphone included in the at least one second audio module are corrected, apply an echo parameter compensating for a delay caused by a change in a distance between the at least one speaker and the at least one microphone to the at least one first microphone and/or second microphone in correspondence to the extended distance.

According to various embodiments, an electronic device includes a housing including a first housing part and a second housing part configured to movably engage with the first housing part between a retracted position and an extended position. The electronic device includes a flexible display coupled to the first housing part and the second housing part such that a size of an area of the flexible display that is visible from a front side of the housing changes as the second housing part is moved between the retracted position and the extended position. The electronic device includes an actuator configured to move the second housing part with respect to the first housing part. The electronic device includes a first audio module located on a first side surface of the housing, and a second audio module located on a second side surface of the housing and a processor operatively connected to the flexible display. The processor is configured to identify whether at least a portion of the flexible display is exposed from the front side of the housing. The processor is configured to correct audio signals for the first audio module and the second audio module in response to identifying the at least a portion of the flexible display being exposed.

According to various embodiments, the processor 620 may be configured to, identify a length of the at least a portion of the flexible display, identify an audio parameter corresponding to the length of the at least a portion of the flexible display, and correct the audio signals by applying the audio parameter.

According to various embodiments, the first audio module and the second audio module includes at least one of a speaker or a microphone.

According to various embodiments, the processor 620 may be configured to, identify whether the electronic device is disposed in a landscape mode or a portrait mode, when the electronic device is disposed in the landscape mode, identify a length of the at least a portion of the flexible display and correct the audio signals for the first audio module and the second audio module by applying the audio parameter.

According to various embodiments, the processor 620 may be configured to, apply different audio parameters to the audio signals for the first audio module and the second audio module when the electronic device is disposed in the portrait.

Figure 7:
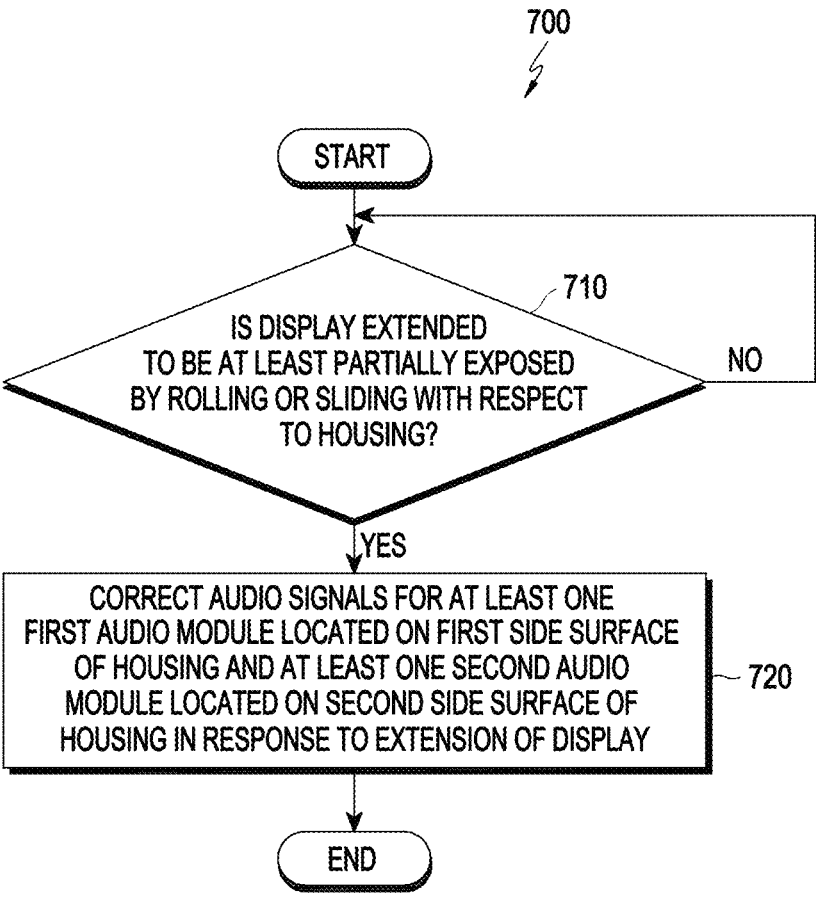
FIG. 7 is a flowchart illustrating an operation of correcting audio performance in an electronic device according to various embodiments.

FIG. 7 is a flowchart illustrating a method 700 for correcting audio performance in an electronic device according to various embodiments.

In an embodiment and referring to FIG. 7, the method 700 may include operations 710 and 720. Each step/operation of the method 700 of FIG. 7 may be performed by at least one of electronic devices (e.g., the electronic device 101 of FIG. 1, the electronic devices 201, 202, 203, and 204 of FIG. 2, and/or the electronic device 101 of FIGS. 4 and 5, and/or at least one processor of the electronic device).

Referring to FIG. 7, according to various embodiments, the electronic device 101 may identify whether at least a portion of the display is extended to be exposed by moving with rolling or sliding with respect to a housing (e.g., the housing 420 of FIGS. 4 and 5), in operation 710. According to various embodiments, the electronic device 101 may identify whether at least a portion of the display is exposed to the front surface of the electronic device by moving with rolling or sliding with respect to the housing.

According to various embodiments, in operation 720, the electronic device 101 may correct an audio signal for at least one first audio module located on a first side surface (e.g., the first side surface 440 of FIGS. 4 and 5) of the housing and/or an audio signal for at least one second audio module located on a second side surface (e.g., the second side surface 450 of FIGS. 4 and 5) of the housing in response to the extension of the display (or in response to identifying the at least a portion of the display being exposed). The extension of the display may be referred to as "at least a portion of the display is visually exposed"

According to various embodiments, correcting the audio signals may include identifying an extended distance (or movement distance) of the display in response to the extension of the display, identifying an audio parameter corresponding to the extended distance, and/or correcting the audio signals for the at least one first audio module and/or the at least one second audio module by applying the identified audio parameter.

According to various embodiments, each of the at least one first audio module and the at least one second audio module may include at least one of a speaker or a microphone.

According to various embodiments, correcting the audio signals may include identifying whether the electronic device is disposed in a landscape mode or a portrait mode, and when the electronic device is disposed in the landscape mode, identifying the extended distance of the display, and/or correcting the audio signals for the at least one first audio module and/or the at least one second audio module by applying an audio parameter of the landscape mode corresponding to the extended distance.

According to various embodiments, correcting the audio signals may include, when the electronic device is disposed in the portrait mode, applying different audio parameters to the audio signals for the at least one first audio module and/or the at least one second audio module.

According to various embodiments, correcting the audio signals may include, when the first side surface of the housing corresponds to a bottom, and the second side surface corresponds to a top, applying a first audio parameter to the at least one first audio module located on the bottom, and/or applying a second audio parameter corresponding to the extended distance to the at least one second audio module located on the top.

According to various embodiments, correcting the audio signals may include, when the extended distance is a maximum distance, applying an audio parameter increasing a high frequency band and/or decreasing a low frequency band.

According to various embodiments, correcting the audio signals may include, when audio signals for at least one first speaker included in the at least one first audio module and/or at least one second speaker included in the at least one second audio module are corrected, applying the same audio parameter to the first speaker and the second speaker.

According to various embodiments, correcting the audio signals may include, when audio signals for at least one first speaker and/or at least one first microphone included in the at least one first audio module, and/or at least one second speaker and/or at least one second microphone included in the at least one second audio module are corrected, applying an echo parameter compensating for a delay caused by a change in a distance between the at least one speaker and/or the at least one microphone to the at least one first microphone and/or second microphone in correspondence to the extended distance.

Figure 8:
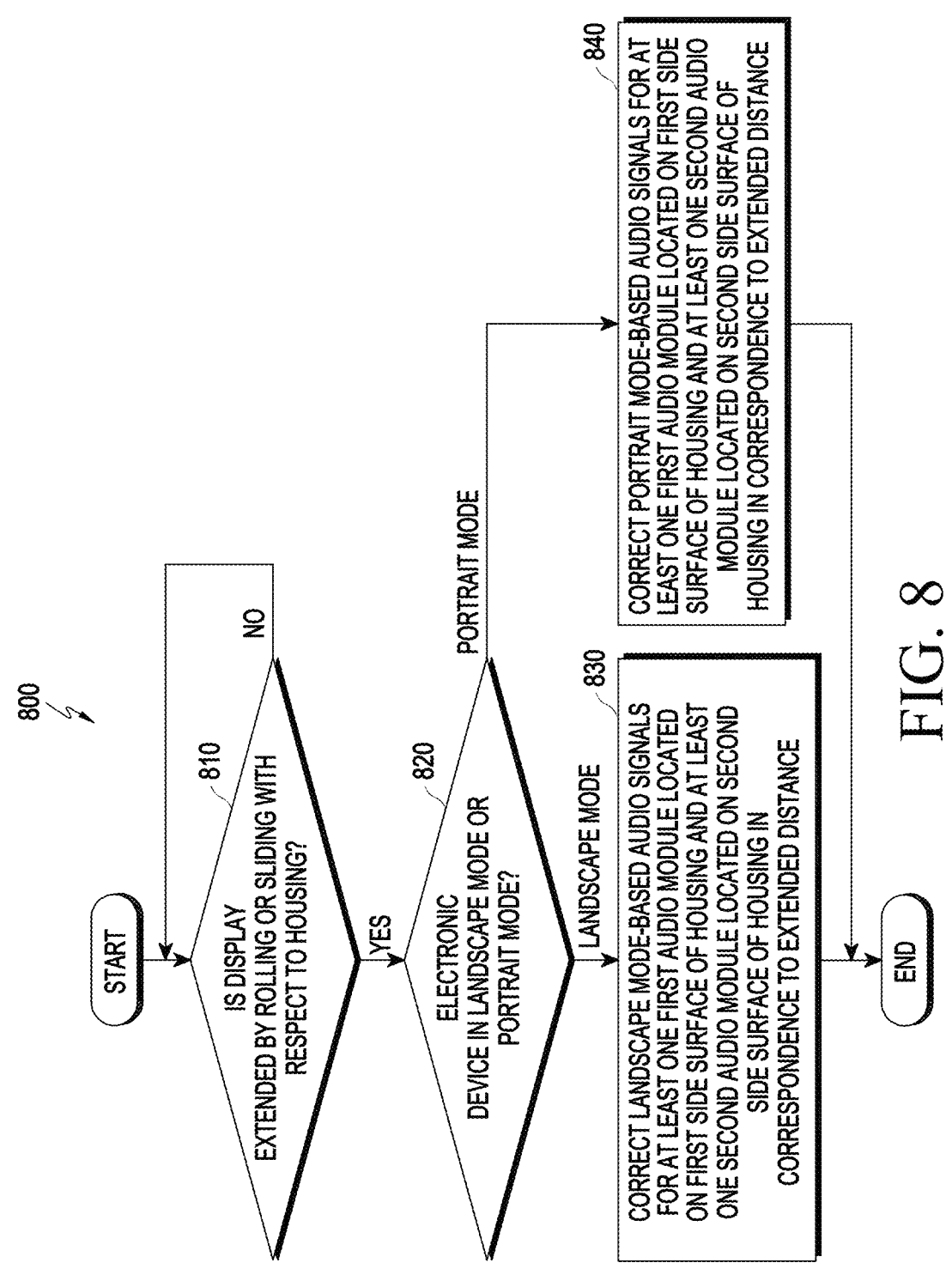
FIG. 8 is a flowchart illustrating an operation of correcting audio performance in an electronic device according to various embodiments.

FIG. 8 is a flowchart illustrating a method for correcting audio performance in an electronic device 101 according to various embodiments.

In an embodiment and referring to FIG. 8, the method 800 may include operations 810 to 840. Each step/operation of the operation method of FIG. 8 may be performed by at least one of electronic devices (e.g., the electronic device 101 of FIG. 1, the electronic devices 201, 202, 203, and 204 of FIG. 2, the electronic device 101 of FIGS. 4 and 5, and at least one processor of the electronic device). In an embodiment, at least one of operations 810 to 840 may be omitted, the order of some operations may be changed, and/or another operation may be added.

In operation 810, the electronic device 101 may identify whether the display is extended by rolling or sliding with respect to the housing according to an embodiment.

In operation 820, the electronic device 101 may identify whether the electronic device 101 is placed in the landscape mode or the portrait mode. According to an embodiment, the electronic device 101 may identify the posture of the electronic device 101 based on information sensed by the sensor module 676, and/or identify whether the electronic device 101 is in the landscape or portrait orientation.

In an embodiment and in response to the orientation of the electronic device 101 in the landscape mode, the electronic device 101 may correct landscape mode-based audio signals for at least one first audio module located on the first side surface (e.g., the first side surface 440 of FIGS. 4 and 5) of the housing and/or at least one second audio module located on the second side surface (e.g., the second side surface 450 of FIGS. 4 and 5) of the housing, in correspondence to an extended distance of the display in operation 830.

Figure 9A:
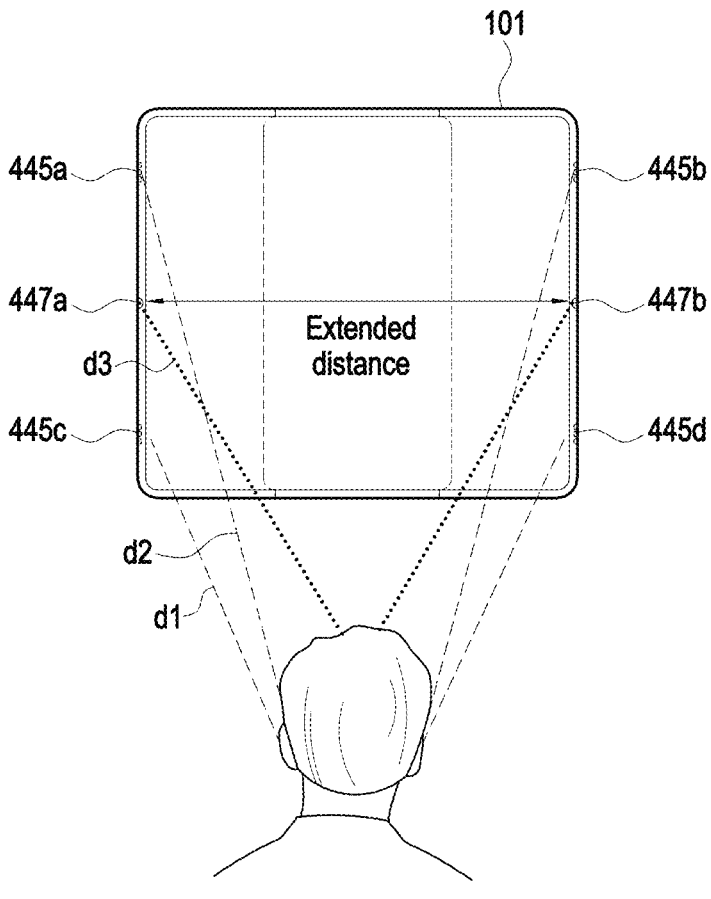
FIG. 9A is a visual diagram illustrating a distance between audio modules with respect to a user, when an electronic device is horizontally disposed according to various embodiments.

In an embodiment, reference may be made to FIG. 9A to describe the landscape mode of the electronic device 101 in detail.

FIG. 9A is a visual diagram illustrating a distance between audio modules with respect to a user, when an electronic device 101 is horizontally disposed according to various embodiments.

In the example of FIG. 9A, according to an embodiment, one first microphone 447a and two first speakers 445a and 445c are disposed on the first side surface of the electronic device 101, and one second microphone 447b and two second speakers 445b and 445d are disposed on the second side surface corresponding to the first side surface. When the electronic device 101 is in the landscape orientation, audio parameters to be applied may be determined on the assumption that the user is at a fixed position, for example, at the center.

For example, according to an embodiment, in the case that the user's position is fixed, when the distances between the user and the first speakers 445a and 445c are, for example, d1 and d2, and the distance between the user and the first microphone 447a is d3, the distance to the second speakers 445b and 445d may be equal to d1 and d2, and the distance to the second microphone 447b may also be equal to d3.

Accordingly, in an embodiment, when the size of the exposed area of the flexible display of the electronic device 101 increases, that is, as the extended distance increases, the distance between the user (e.g., the mouth and/or the ear) and/or the one or more speakers and/or microphones increases. However, because the distances increase in both directions, an audio parameter for compensating for only a decrease in the output of an audio signal according to the extended distance may be applied. For example, since the attenuation of a high frequency band is greater than that of a low frequency band as the extended distance becomes longer, the electronic device 101 may perform audio signal correction by increasing the high frequency band and/or decreasing the low frequency band. Accordingly, the electronic device 101 may apply an audio parameter corresponding to the extended distance to control and/or to change the magnitude and/or frequency characteristics of audio output signals applied to the first speakers 445a and 445c and/or the second speakers 445b and 445d.

According to an embodiment, whether the electronic device 101 is in the landscape or portrait orientation and/or a mode of using only a speaker and/or a mode of simultaneously using a speaker and/or a microphone may correspond to criteria for selecting audio parameters. According to the audio parameter selection criteria, the electronic device 101 may apply any one of a plurality of audio parameters.

According to an embodiment, when the electronic device 101 is in the landscape orientation and/or the mode of using only a speaker, the same audio parameter may be applied to an audio signal of each speaker. For example, operations such as an audio file playback function and/or a video recording function may correspond to the mode of using only a speaker. The electronic device 101 may use the same audio parameter for an output audio signal through a speaker, generated by performing the audio file playback function and/or the video recording function. Accordingly, audio signals to which the same audio parameter is applied may be output through the left and/or right speakers. In this case, the same audio parameter may tune an audible band, for example, 20 Hz to 20 kHz to correct a sound volume/sound quality. Accordingly, in an embodiment, the electronic device 101 may increase or decrease a gain on a frequency basis. Since a part corresponding to a high frequency may be less audible to the user as the flexible display is extended, the electronic device 101 may apply an audio parameter that sets a higher gain for the high frequency band to an output audio signal through each speaker. For example, the electronic device 101 may set a highest gain for 20 kHz and/or sequentially apply lower gains to frequencies lower than 20 KHz.

According to an embodiment, when the electronic device 101 is in the landscape orientation and/or the mode of simultaneously using a speaker and a microphone, the electronic device 101 may apply the same audio parameter to an audio signal of each speaker, whereas it may apply a different audio parameter to each microphone. For example, an operation such as a voice call function may correspond to the mode of simultaneously using a speaker and a microphone.

According to an embodiment, the electronic device 101 may use the same first audio parameter for audio signals output through the speakers, generated by performing the voice call function. That is, the same audio parameter may be applied to an audio signal for each speaker regardless of the left and right speakers.

On the other hand, in an embodiment, there may be a microphone obtaining a user's voice and a microphone obtaining an external sound, and the electronic device 101 may use an echo parameter to remove an echo of an external sound through any one microphone. According to an embodiment, the electronic device 101 may correct an audio signal for the first microphone 447a by applying an echo parameter to the audio signal, whereas it may correct an audio signal for the second microphone 447b on the opposite side by applying a second audio parameter to the audio signal.

For example, in an embodiment, the electronic device 101 may compensate gains sequentially from a high frequency to a low frequency according to an extended distance by applying the second audio parameter determined based on a determined distance in the landscape mode to any one microphone. For example, the first audio parameter may be applied to audio signals of the left and/or right speakers, whereas an echo parameter may be applied to an audio signal of the first microphone, and/or the second audio parameter may be applied to an audio signal of the second microphone. In this case, the first audio parameter applied to the speakers and the second audio parameter applied to the microphone may be different from each other.

According to an embodiment, the echo parameter may include an echo path delay parameter. An echo path delay may refer to a time until a sound output from a speaker is input to a microphone. Therefore, when an error occurs in the echo path delay, an echo may not be canceled. Therefore, according to various embodiments, when the flexible display is extended, the distances between one or more microphones and a speaker changes, and thus it is necessary to compensate for the echo path delay according to the change in the distance between the microphones and the speaker. For example, when the echo path delay is 10 ms before extension of the flexible display, the electronic device 101 may apply an echo parameter obtained by changing the echo path delay to 100 ms after the extension to an audio signal of one microphone.

In response to arrangement of the electronic device 101 in the portrait mode, in operation 840, the electronic device 101 may correct a portrait mode-based audio signal for the at least one first audio module located on the first side surface (e.g., the first side surface 440 of FIGS. 4 and 5) of the housing and/or a portrait mode-based audio signal for the at least one second audio module located on the second side surface (e.g., the second surface 450 of FIGS. 4 and 5) of the housing in correspondence to the extended distance of the display.

According to an embodiment, the electronic device 101 may correct the audio signals by applying a different audio parameter for the portrait mode to each of the first audio module and the second audio module in correspondence to the extended distance of the display.

Figure 9B:
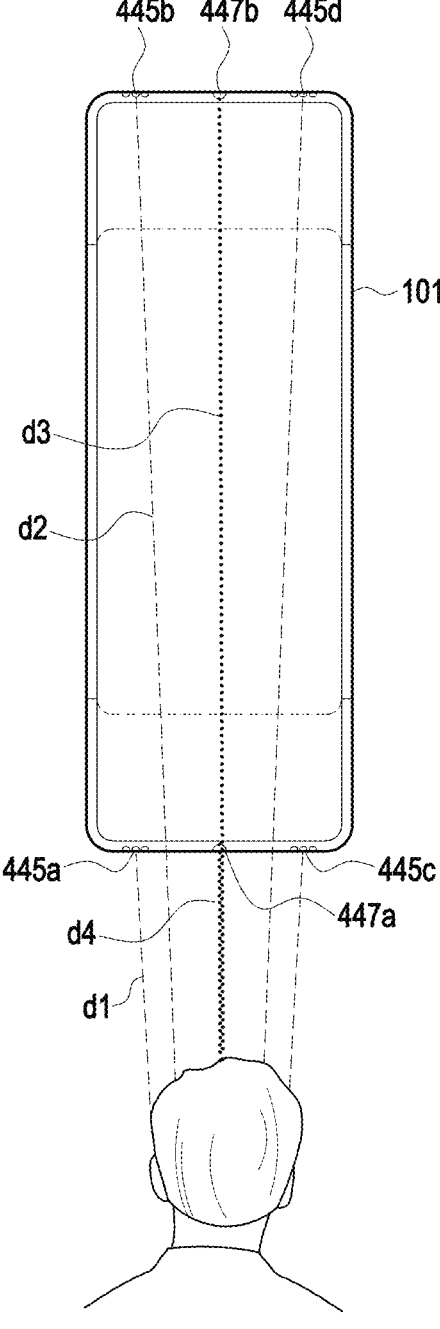
FIG. 9B is a visual diagram illustrating a distance between audio modules with respect to a user, when an electronic device is vertically disposed according to various embodiments.

In an embodiment, reference may be made to FIG. 9B to describe the portrait mode of the electronic device 101 in detail.

FIG. 9B is a visual diagram illustrating a distance between audio modules with respect to a user, when an electronic device 101 is disposed in the portrait orientation according to various embodiments.

In an embodiment and referring to FIG. 9B, one first microphone 447a and two first speakers 445a and 445c are disposed on the first side surface of the electronic device 101, and one second microphone 447b and two second speakers 445b and 445d are disposed on the second side surface, as in FIG. 9A. When the electronic device 101 is in the portrait orientation, the electronic device 101 may determine an audio parameter to be applied on the assumption that the user is at a fixed position, for example, at the center. For example, when the electronic device is used in a stand-mounted form, it may be assumed that the lower speakers and the lower microphone are at fixed positions, and the upper speakers and the upper microphone are located relatively far from the user.

For example, in an embodiment, when the user's position is fixed, the distances between the user and the first speakers 445a and 445c are d1, and the distance between the user and the first microphone 447a is d4. When the distances to the second speakers 445b and 445d on the opposite side are d2 and the distance to the second microphone 447b is d3, the distance to the at least one speaker and microphone located on the bottom and the distance to the at least one speaker and microphone located on the top may be different with respect to the user.

According to an embodiment, the electronic device 101 may identify the distances between the user and the respective speakers and/or microphones, for example, d1, d2, d3, and d4, using a single sensor. For example, the electronic device 101 may identify the distances d1, d2, d3, and d4 between the user and the respective speakers and/or microphones, using a proximity sensor or a 3D camera.

According to an embodiment, when the electronic device 101 is in the portrait orientation and the mode of using only a speaker, a different audio parameter may be applied to an audio signal of each speaker. For example, the electronic device 101 may correct an audio signal for the lower speakers by applying a first audio parameter because the lower speakers are at fixed positions. For the upper speakers, the electronic device 101 may identify a second audio parameter corresponding to an extended distance and correct an audio signal by applying the second audio parameter because the positions of the upper speakers are changed. That is, different audio parameters may be applied to the audio signals of the upper speakers and the lower speakers.

According to an embodiment, when the electronic device 101 is in the portrait orientation and the mode of simultaneously using a speaker and/or a microphone, the electronic device 101 may apply a different third audio parameter to an audio signal of each speaker, as described above. Further, the electronic device 101 may apply a different fourth audio parameter to each microphone. For example, the fourth audio parameter may be applied to the lower microphone on the assumption that the lower microphone is at a fixed position. Because the upper microphone may be relatively far from the user, the distance between at least one microphone and a speaker changes when the flexible display is extended, and thus an echo path delay caused by the change of the distance between the microphone and the speaker needs to be compensated for. Accordingly, the electronic device 101 may apply an echo parameter compensating for the echo path delay to an audio signal of any one microphone. Accordingly, for the upper microphone, the electronic device 101 may compensate gains sequentially (or in a stepwise manner) from a high frequency to a low frequency according to an extended distance.

Figure 10:
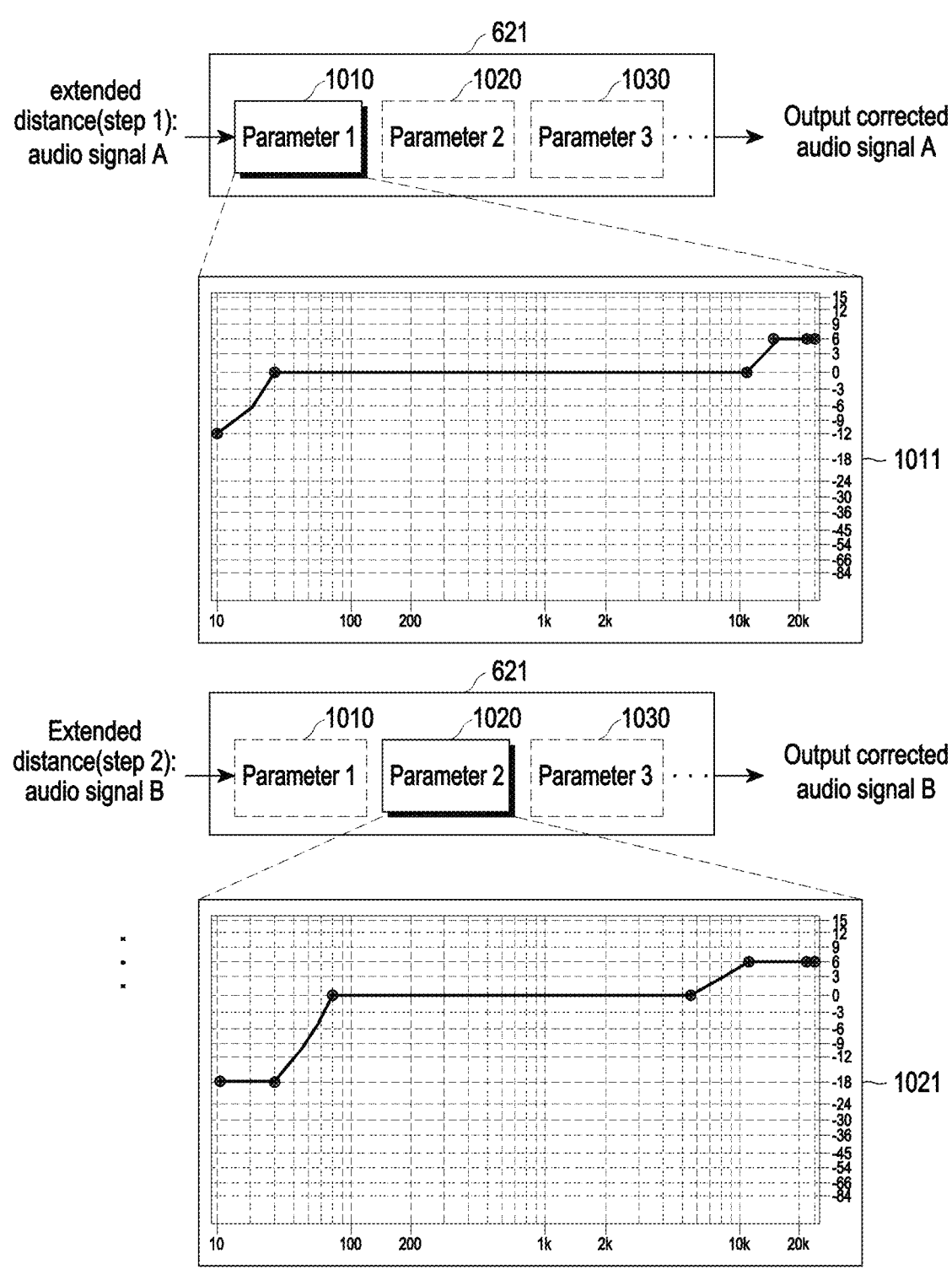
FIG. 10 is a diagram illustrating a process of correcting an audio signal for each extended distance according to various embodiments.

FIG. 10 is a diagram referred to for describing a process of correcting an audio signal on an extended distance basis according to various embodiments.

FIG. 10 illustrates an embodiment in which an audio signal is corrected by selecting a different audio parameter corresponding to an extended distance, by way of example.

In an embodiment and referring to FIG. 10, in the case that an extended distance is step 1, when receiving audio signal A, the audio processor 621 (or the processor 620 in FIG. 6) may output corrected audio signal A by applying audio parameter 1 1010 based on the extended distance among a plurality of audio parameters 1010, 1020, and 1030. For example, audio parameter 1 1010 represented as a frequency waveform graph 1011 may be for filtering to reduce a signal in a low frequency band.

On the other hand, in an embodiment, in the case that the extended distance is step 2, when receiving audio signal B, the audio processor 621 (or the processor 620 in FIG. 6) may output corrected audio signal B by applying audio parameter 2 1020 based on the extended distance among the plurality of audio parameters 1010, 1020, and 1030. For example, audio parameter 2 1020 represented as a frequency waveform graph 1021 may be for filtering to increase a signal in a high frequency band.

According to an embodiment, even if the flexible display has the same extended distance in the landscape mode and in the portrait mode, an audio parameter corresponding to the extended distance in the landscape mode and an audio parameter corresponding to the extended distance in the portrait mode may be different from each other. For example, different audio parameters may be applied even though the distance between the speakers on both side surfaces is the same in the landscape mode and the portrait mode. According to an embodiment, the electronic device 101 may selectively apply an audio parameter based on an arrangement orientation (e.g., the landscape mode or the portrait mode) as well as an extended distance of the flexible display. In addition to the extended distance and arrangement orientation of the flexible display, the electronic device 101 may consider whether only a speaker is used or a speaker and a microphone are used simultaneously in selecting an audio parameter.

Figure 11:
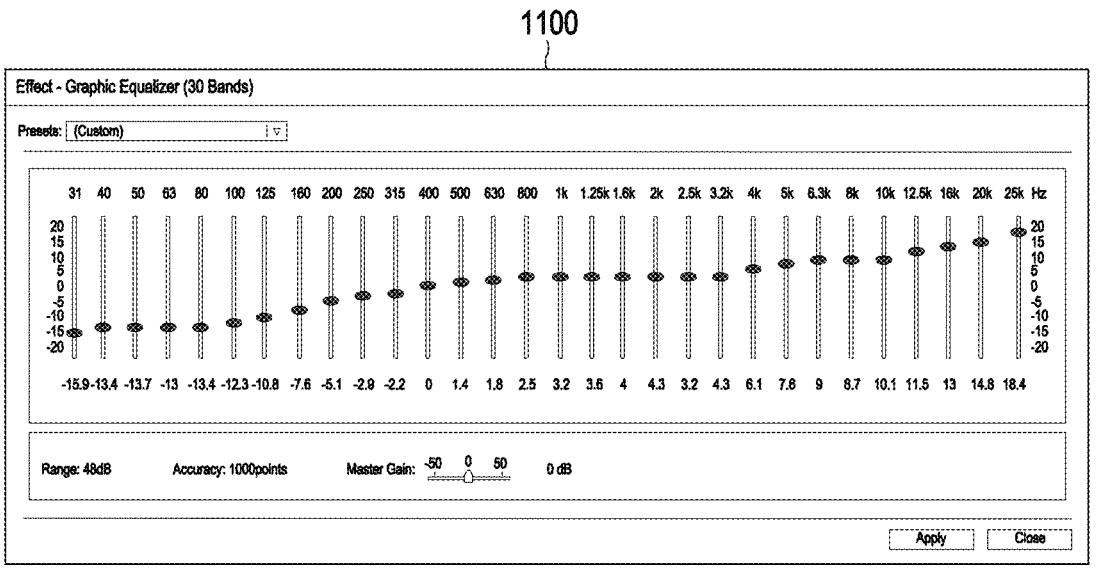
FIG. 11 is visual diagram illustrating an audio filter according to various embodiments.

FIG. 11 is a visual diagram 1100 illustrating an audio filter according to various embodiments.

In the example of FIG. 11, a graphic equalizer for selectively emphasizing or filtering a sound in a specific frequency band is shown in an embodiment.

According to an embodiment, the electronic device 101 may automatically correct an audio signal in response to extension and/or contraction of the flexible display. For example, as the extended distance increases, the electronic device 101 may amplify a high frequency band in the speakers on both sides. According to an embodiment, when receiving a user input for identifying a current sound volume/sound quality, the electronic device 101 may display an equalizer screen as illustrated in FIG. 11.

Further, according to an embodiment, although the electronic device 101 may automatically perform audio tuning in response to extension and/or contraction of the flexible display without separate user control, for example, when the user directly selects an option and/or inputs a setting value during the audio tuning process, the electronic device 101 may apply an audio parameter reflecting not only the extended distance of the flexible display but also the selected option and/or setting value. For example, when the extended distance increases in the portrait mode of the electronic device 101, high-frequency band amplification is performed on the upper and/or lower speakers according to the audio tuning in the electronic device 101. In the case of a setting to increase a woofer effect, the electronic device 101 may apply an audio parameter for increasing a low frequency to the lower speakers and an audio parameter for increasing a high frequency to the upper speakers.

According to an embodiment, the electronic device 101 may tune an audible band, for example, 20 Hz to 20 kHz by applying an audio parameter. Accordingly, the electronic device 101 may increase or decrease a gain on a frequency basis.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. Moreover, the embodiments or parts of the embodiments may be combined in whole or in part without departing from the scope of the invention.

What is claimed is:

1. An electronic device, comprising:
   a housing including a first housing part and a second housing part configured to movably engage with the first housing part between a retracted position and an extended position;
   a flexible display coupled to the first housing part and the second housing part such that a size of an area of the flexible display that is visible from a front side of the housing changes as the second housing part is moved between the retracted position and the extended position;
   an actuator configured to move the second housing part with respect to the first housing part;
   first audio circuitry and second audio circuitry; and
   at least one processor; and
   memory storing instructions that, when executed by the at least one processor, cause the electronic device to:
   identify a state in which the flexible display is at least partially exposed,
   identify a first audio parameter corresponding to the state of the flexible display, and
   compensate audio signals for the first audio circuitry or the second audio circuitry based on the first audio parameter.

2. The electronic device of claim 1, wherein the first audio circuitry is located on a first side portion of the housing, and the second audio circuitry is located on a second side portion of the housing.

3. The electronic device of claim 2, wherein the instructions cause the electronic device to:
   identify a size of an exposed portion of the flexible display,
   identify a second audio parameter corresponding to the size of the exposed portion of the flexible display, and compensate the audio signals by applying the second audio parameter.

4. The electronic device of claim 2, wherein the instructions cause the electronic device to:

identify whether the electronic device is disposed in a landscape mode or a portrait mode, in case that the electronic device is disposed in the landscape mode, identify a third audio parameter of the landscape mode corresponding to a size of an exposed portion of the flexible display, and compensate the audio signals for the first audio circuitry or the second audio circuitry by applying the third audio parameter of the landscape mode.

5. The electronic device of claim 4, wherein the instructions cause the electronic device to:

in case that the electronic device is disposed in the portrait mode, compensate the audio signals for the first audio circuitry or the second audio circuitry by applying a fourth audio parameters to the audio signals for the first audio circuitry and the second audio circuitry.

6. The electronic device of claim 1, wherein the flexible display is configured to move by rolling or sliding with respect to the housing so that the flexible display is at least partially exposed from inside of the housing to a front portion of the electronic device, or is retracted into the housing.

7. The electronic device of claim 1, wherein the first audio circuitry and the second audio circuitry include at least one of a speaker or a microphone.

8. The electronic device of claim 1, wherein the instructions cause the electronic device to:

in case that a first side portion of the housing corresponds to a bottom, and a second side portion corresponds to a top, apply a fifth audio parameter to the first audio circuitry located on the bottom, and apply a sixth audio parameter corresponding to a size of an exposed portion of the flexible display to the second audio circuitry located on the top.

9. The electronic device of claim 1, wherein the instructions cause the electronic device to:

in case that a size of an exposed portion of the flexible display is a maximum size, compensate the audio signals by applying an audio parameter increasing a high frequency band and decreasing a low frequency band.

10. A method of correcting audio performance in an electronic device including a flexible display, the method comprising:

identifying a state in which the flexible display is at least partially exposed, identifying a first audio parameter corresponding to the state of the flexible display, and compensating audio signals for first audio circuitry or second audio circuitry based on the first audio parameter.

11. The method of claim 10, wherein the compensating of the audio signals includes:

compensating the audio signals for the first audio circuitry located on a first side portion of a housing of the electronic device, and the second audio circuitry located on a second side portion of the housing.

12. The method of claim 11, wherein compensating the audio signals includes:

identifying a size of an exposed portion of the flexible display, identifying a second audio parameter corresponding to the size of the exposed portion of the flexible display, and compensating the audio signals by applying the second audio parameter.

13. The method of claim 11, wherein the first audio circuitry and the second audio circuitry include at least one of a speaker or a microphone.

14. The method of claim 11, wherein compensating the audio signals includes:

identifying whether the electronic device is disposed in a landscape mode or a portrait mode, in case that the electronic device is disposed in the landscape mode, identifying a third audio parameter of the landscape mode corresponding to a size of an exposed portion of the flexible display, and compensating the audio signals for the first audio circuitry or the second audio circuitry by applying the third audio parameter of the landscape mode.

15. The method of claim 14, wherein compensating the audio signals includes:

in case that the electronic device is disposed in the portrait mode, compensating the audio signals for the first audio circuitry and the second audio circuitry by applying a fourth audio parameter to the audio signals for the first audio circuitry and the second audio circuitry.

16. The method of claim 11, wherein compensating the audio signals includes:

in case that the first side portion of the housing corresponds to a bottom, and the second side portion corresponds to a top, applying a fifth audio parameter to the first audio circuitry located on the bottom, and applying a sixth audio parameter corresponding to a size of an exposed portion of the flexible display to the second audio circuitry located on the top.

17. The method of claim 11, wherein compensating the audio signals includes:

in case that a size of an exposed portion of the flexible display is a maximum size, compensating the audio signals by applying an audio parameter increasing a high frequency band and decreasing a low frequency band.

18. The method of claim 10, wherein the flexible display is configured to move by rolling or sliding with respect to a housing of the electronic device so that the flexible display is at least partially exposed from inside of the housing to a front portion of the electronic device, or is retracted into the housing.

* * * * *